Nov. 12, 1935.  R. W. HALE  2,020,683
BRAIDING MECHANISM AND PROCESS
Filed Aug. 16, 1934  7 Sheets-Sheet 4
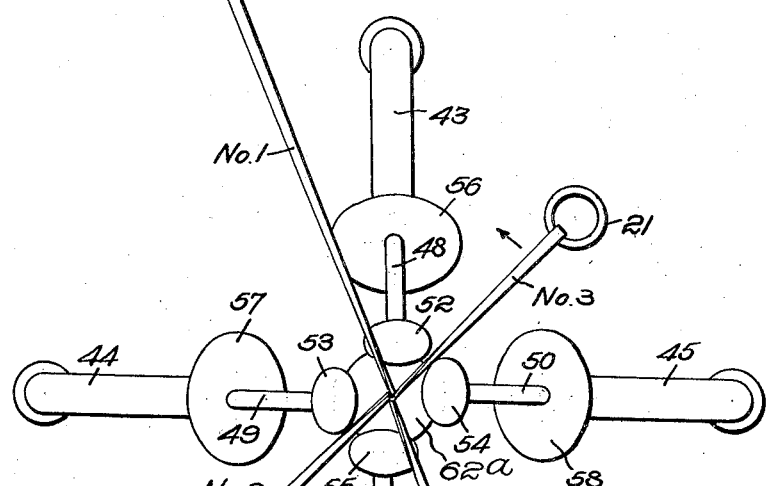
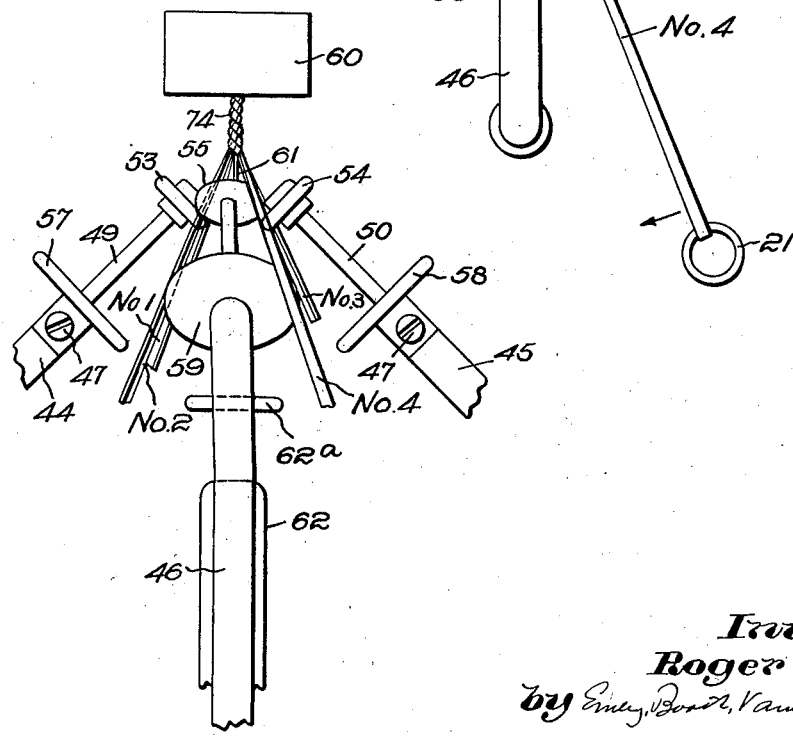
Inventor:
Roger W. Hale,
by *Emery, Booth, Varney and Townsend*
Attys Nov. 12, 1935.    R. W. HALE    2,020,683
BRAIDING MECHANISM AND PROCESS
Filed Aug. 16, 1934    7 Sheets-Sheet 5
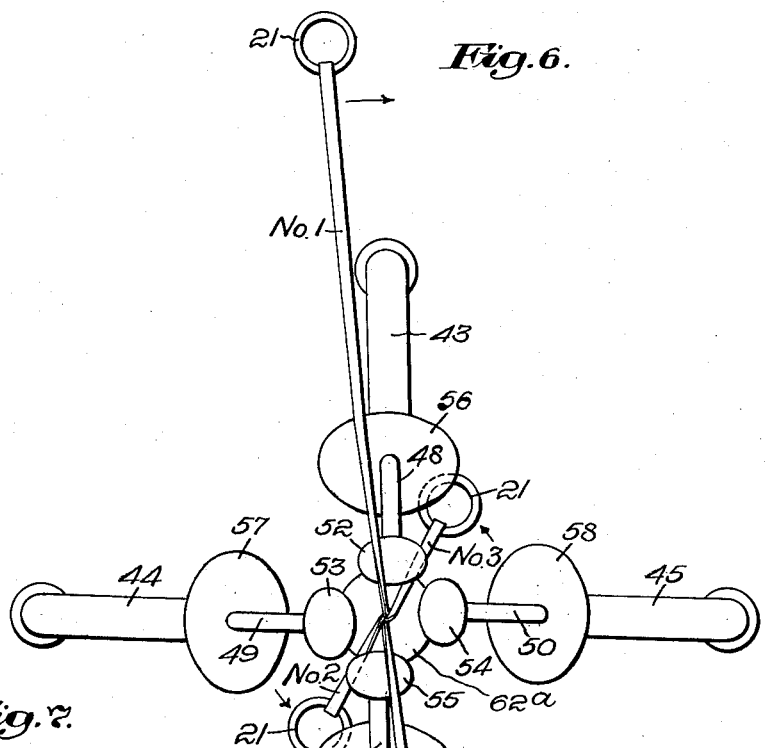
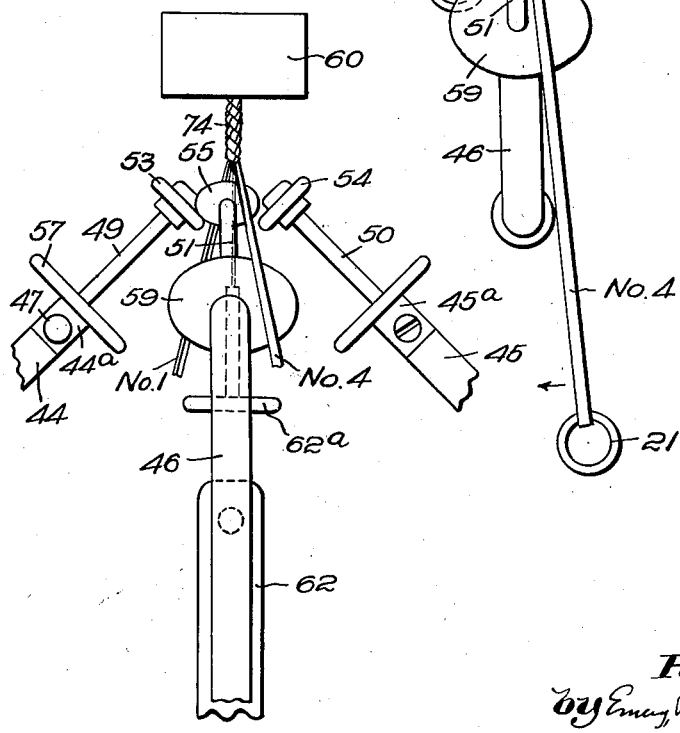
Inventor:
Roger W. Hale,
by Emery, Booth, Varney and Townsend
Attys Nov. 12, 1935.  R. W. HALE  2,020,683
BRAIDING MECHANISM AND PROCESS
Filed Aug. 16, 1934   7 Sheets-Sheet 6

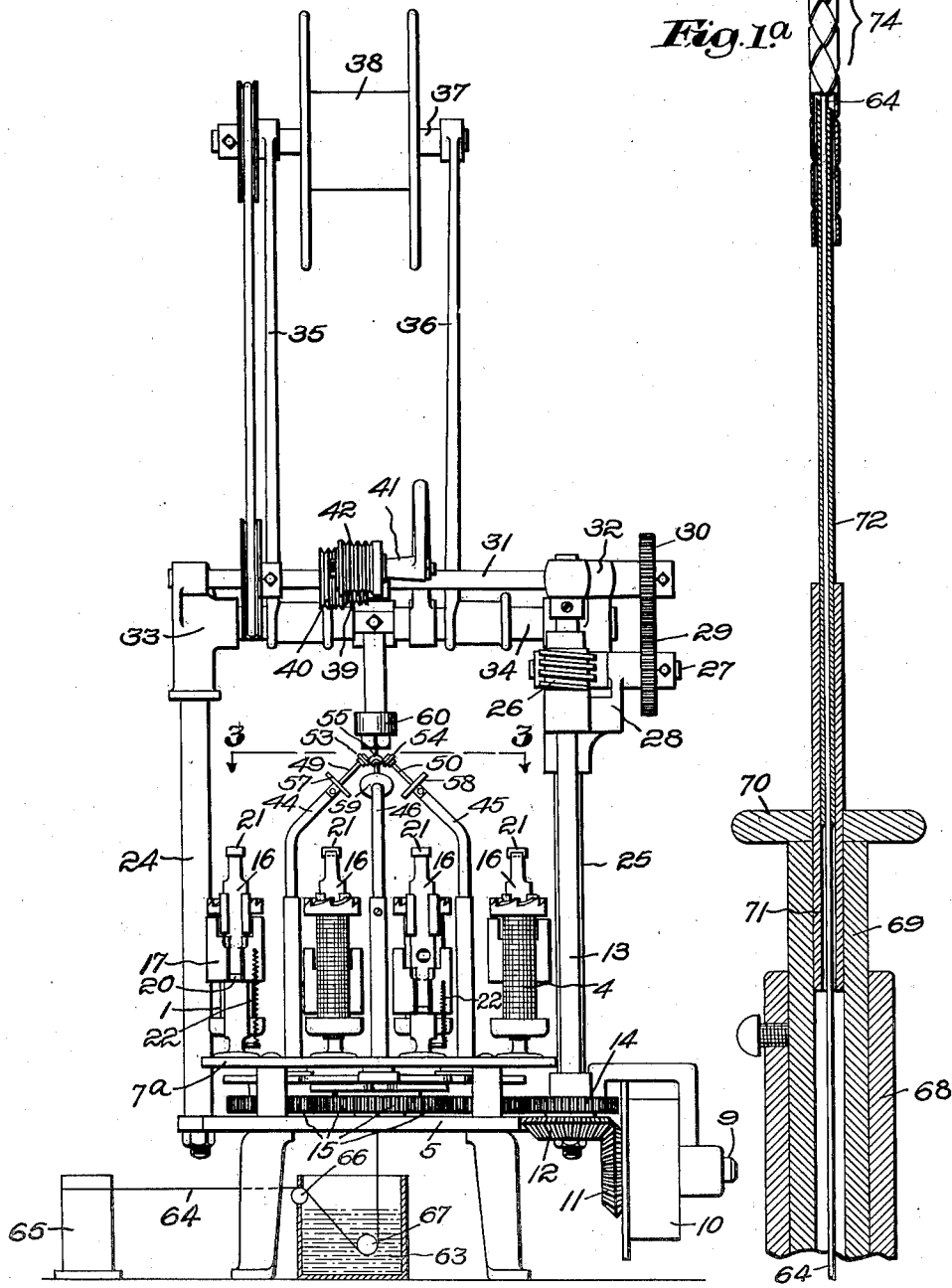

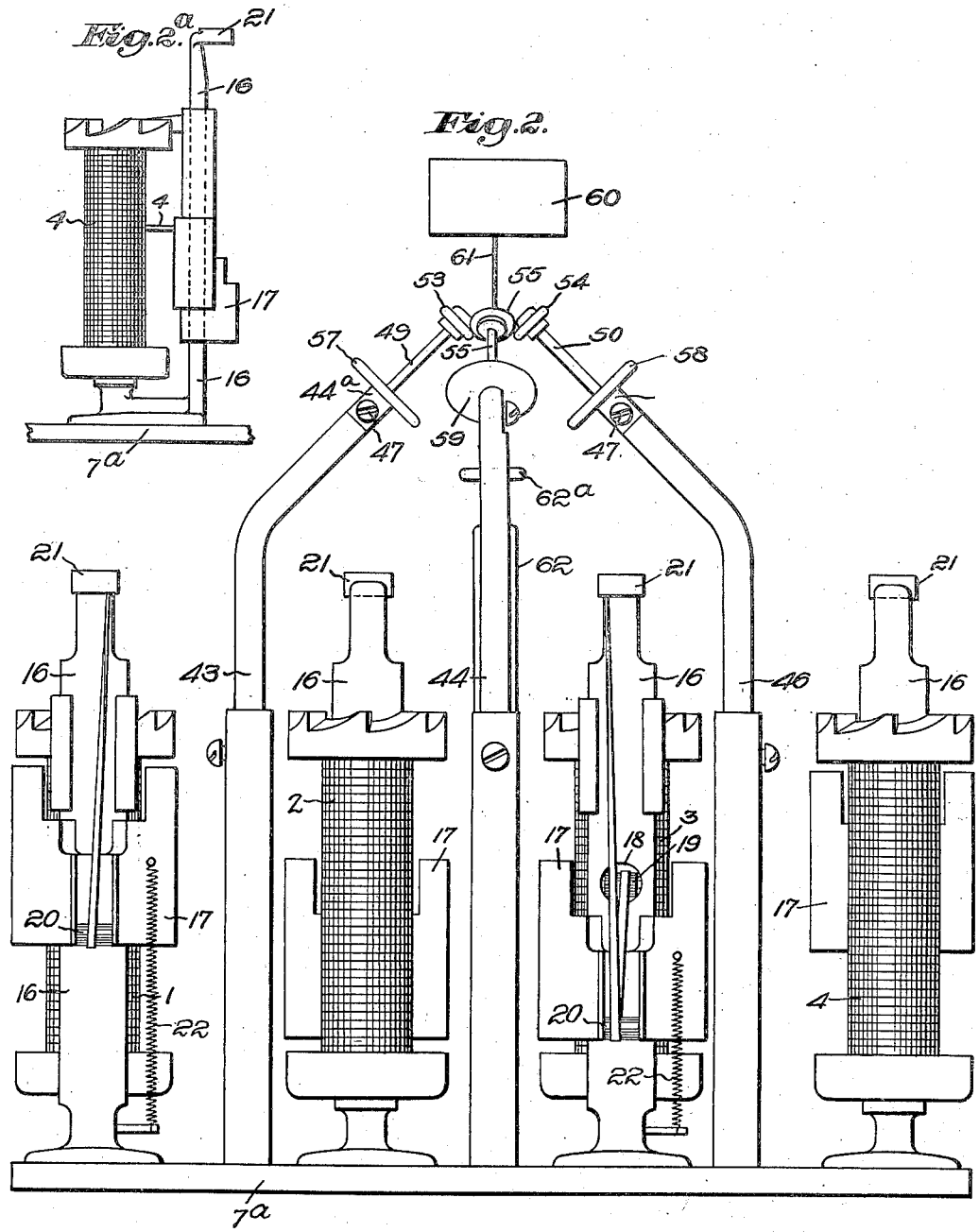

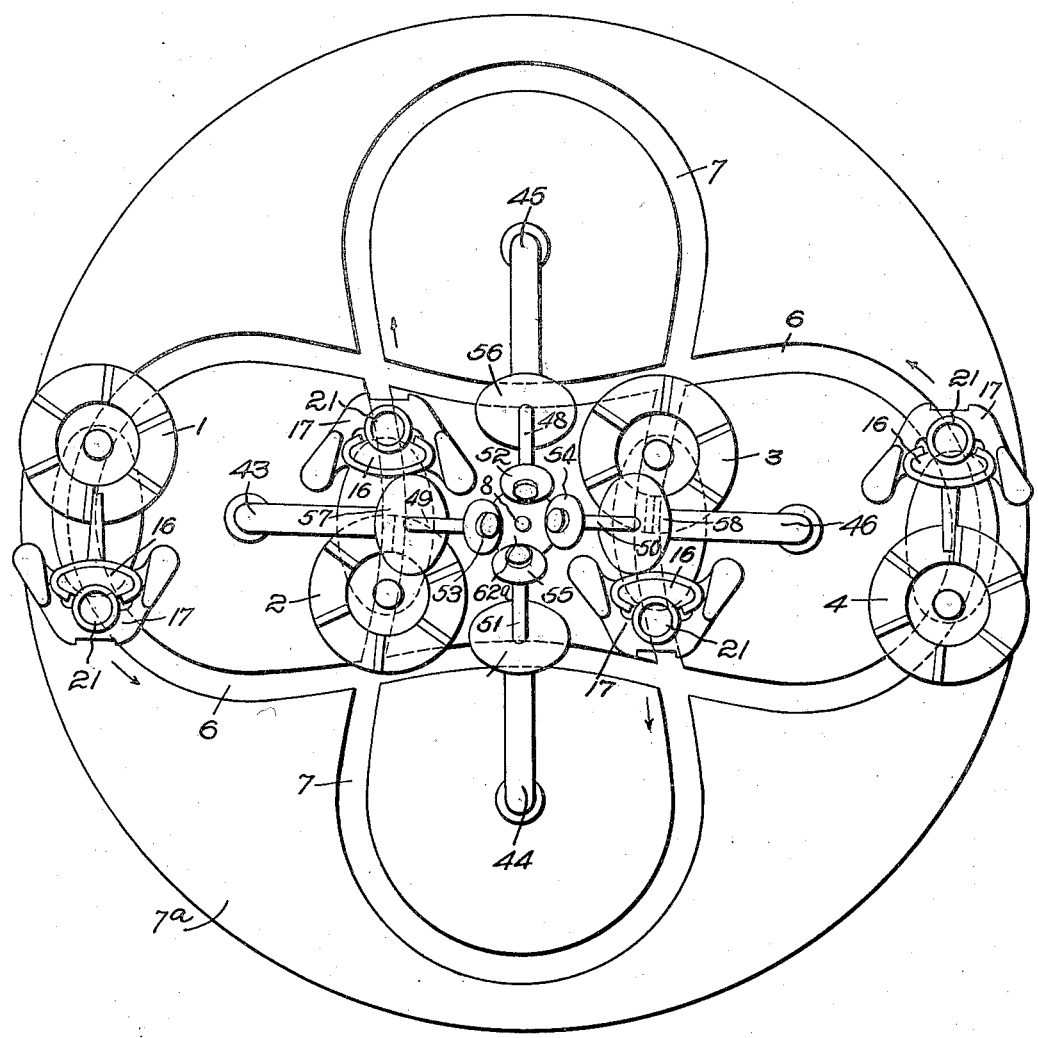

Inventor:
Roger W. Hale,
by Emery, Booth, Varney and Townsend
Attys.

Nov. 12, 1935.    R. W. HALE    2,020,683
BRAIDING MECHANISM AND PROCESS
Filed Aug. 16, 1934    7 Sheets-Sheet 7
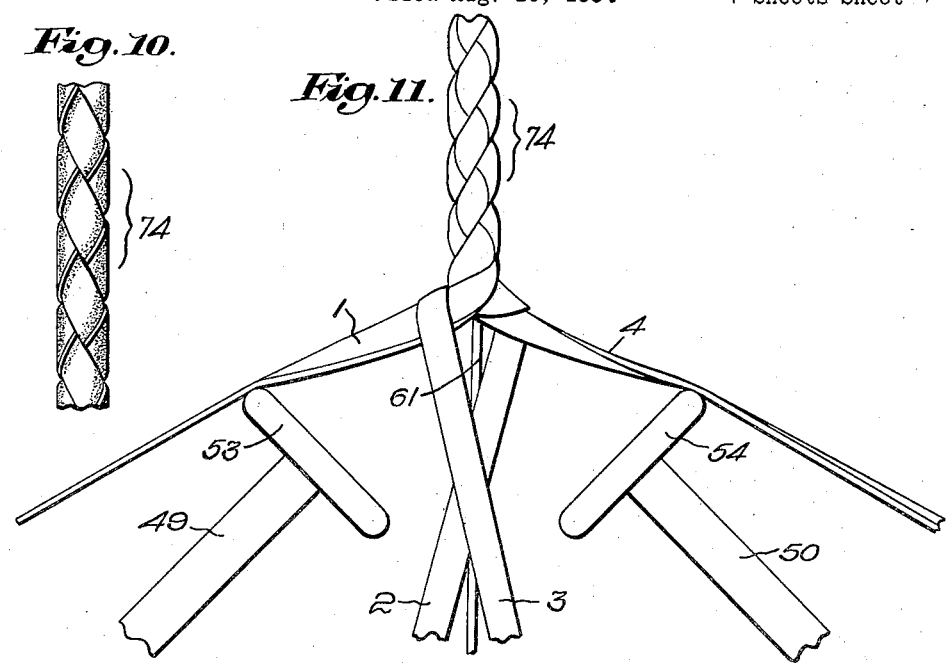

Patented Nov. 12, 1935

2,020,683

UNITED STATES PATENT OFFICE 2,020,683

BRAIDING MECHANISM AND PROCESS

Roger W. Hale, Rumford, R. I.

Application August 16, 1934, Serial No. 740,072

20 Claims. (Cl. 96—3)

This invention relates to mechanism and process for braiding strands each preferably of a substantially flat character.

In order that the principle of the invention may be readily understood, I have in the accompanying drawings illustrated one type or embodiment of mechanism representative of my invention and by which the process of my invention may be practised and the fabric herein described be produced. I have also in said drawings illustrated the product made by the said mechanism in carrying out my said process.

In said drawings,—

Fig. 1 is a front elevation of a braiding machine illustrative of my invention and by which the process thereof may be carried out.

Fig. 1a is a detail in vertical longitudinal section, greatly enlarged, to show means arranged axially of the machine for introducing a lacquer-like material to the strands as they are braided;

Fig. 2 is a front elevation of the two sets of braiding carriers of the machine as they appear when in substantially transverse alignment upon their tracks;

Fig. 2a is a side elevation of one of the braiding carriers and immediately cooperating parts;

Fig. 3 is a view mainly in plan looking down from the section line 3—3 of Fig. 1, passing transversely substantially to the braiding point;

Fig. 4 is a plan view, somewhat diagrammatic, to indicate what is hereinafter referred to as position No. 1 of the four strands of the four braiding carriers and their cooperating guiding or positioning means near the braiding point;

Fig. 5 is a side elevation of the parts shown in Fig. 4 when in said No. 1 position;

Fig. 6 is a view similar to Fig. 4 but with the said parts in what is herein termed position No 2;

Fig. 7 is a side elevation of the parts in said position No. 2, as in Fig. 6;

Fig. 10 is a side elevation enlarged of a small portion of braid made by the mechanism herein disclosed; and Figs. 11 and 12 are somewhat diagrammatic views upon an enlarged scale of the four strands braided by the mechanism herein shown, to indicate, at two different instants of time, the lifting or drawing outwardly of two over-strands to allow the two under-strands to be properly laid.

An important purpose of my invention is to braid together a series of strands each of which strands is substantially flat, and in such a way that the same face of each of said strands is always positioned outermost, so that the completed braid is devoid of any displacement or twisting of any of the strands at any part thereof, and each of said strands is laid smoothly and with the predetermined face thereof always outermost. This result is highly desirable in the case of strands which present two contrasting faces, as, for example, the flesh side and the hair side of a leather strand. According to one customary procedure, a strand, before being wound upon its braiding carrier, is folded along a lengthwise line upon itself, as, for example, by inturning both of its edges so that the inturned edges meet or substantially meet in what is frequently termed a "seam". Obviously, the strand when thus folded presents two faces along one of which extends the said seam. It is therefore highly desirable so to control such strands in the braiding operation as to lay and keep the said side having a seam at the inside, so that nowhere does any of said seams show along the length of the completed braid.

Heretofore so far as I am aware, it has been impossible to accomplish such a result (that is, to lay each of the strands in such a manner that a predetermined or superior face or side thereof is always outermost and the inferior or opposite face or side always innermost), by any mechanism with which I am familiar.

Obviously my invention may be practised upon many different types of braiding machines and in the making of either a round or substantially round braid, or a flat braid. Also the number of braiding carriers may be widely varied in making braid in accordance with my invention.

I have chosen to represent in the accompanying drawings my invention as practised upon a braiding machine having four carriers moving in two pairs or sets along contrasting or differentiated paths.

Figure 8:
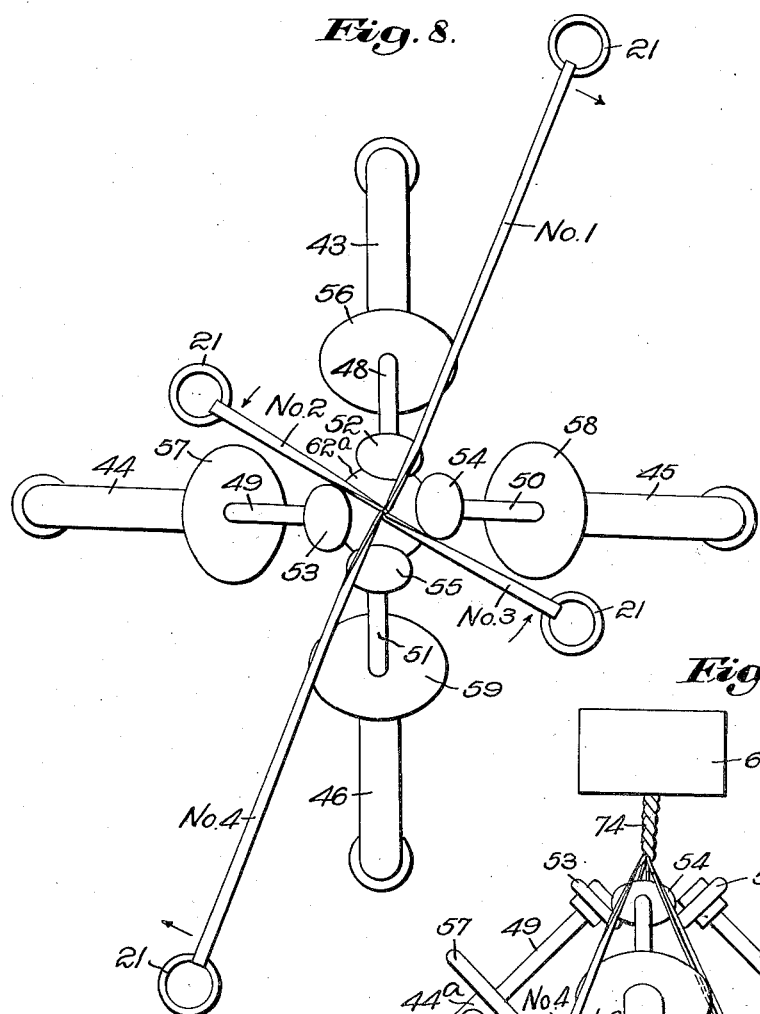
Fig. 8 is a view similar to Fig. 4 but with the said parts in what is termed position No. 3.
Figure 9:
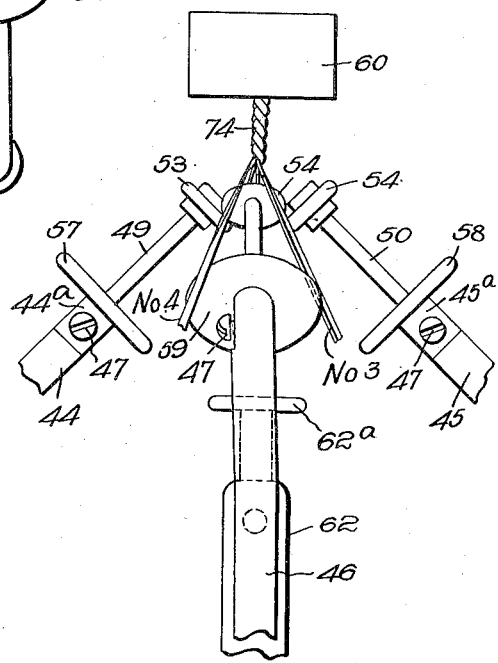
Fig. 9 is a side elevation of the parts in said position No. 3 of Fig. 8.

In the said mechanism each of the two paths is roughly of the form of a figure 8 or rather of an ellipse having the long sides thereof contracted toward each other midlength of the ellipse, the said two ellipses being positioned crosswise of each other in the general arrangement of a Maltese cross.

Without in any way limiting my invention to the type of mechanism herein disclosed, and merely for convenience of description, I will refer in the ensuing description to four strands each proceeding from its own braiding carrier to the braiding point, and I will refer to the said strands as Nos. 1, 2, 3 and 4.

It will be understood that at any instant of time during the braiding operation two of the strands function as under-strands and the other two as over-strands, the said two under-strands almost immediately thereafter functioning as over-strands and said over-strands then functioning as under-strands. In other words, each strand functions at one time as an under-strand and then as an over-strand, again as an under-strand, and so on throughout the entire braiding operation.

Heretofore when it has been attempted to braid flat strands of material the strands when functioning as over-strands would so engage one or more of the under-strands at the braiding point as to turn the leading edge of an under-strand upon itself with the result that said under-strand was gradually turned over more or less, being first slightly and then increasingly deflected or diverted from its true path, and thus was laid with the inferior face out (for a longer or shorter period of time) instead of with the superior face always outermost.

I have provided means to keep a certain face or side (preferably the superior face or side) always outermost, so that the trailing edge of an over-strand is not permitted to contact with the leading edge of an under-strand in such a way or at such a time as to tend to cause the leading edge of the under-strand to be diverted from its proper direction or position. This I preferably accomplish by rectifying the path of the over-strands and under-strands, as by drawing outwardly or lifting the two over-strands (referring to the disclosed type of mechanism), so as to allow the two under-strands not only to be laid with the superior face always outermost, but in such a way as to allow the two under-strands to crowd up tight into the vertex of the angle that is made by one of the over-strands and the axial member hereinafter referred to and which extends from below the braiding point along the exact axial line of the braid to some suitable point a short distance above the braiding point.

Preferably the means for so acting upon the strands is positioned in close proximity to the braiding point and in the disclosed embodiment of my invention to which my invention is in no wise limited, such means comprises for each strand a small freely rotatable disk or roll along the periphery of which passes the strand to which the said disk or roll pertains.

Referring more particularly to the drawings, and first to Figs. 1 to 3, the braiding machine is provided with any desired number of braiding carriers, but for convenience of illustration and explanation, I have represented a braiding machine having four carriers which for convenience of description I have numbered 1, 2, 3 and 4 in said figures to correspond to strands Nos. 1, 2, 3 and 4. The machine is provided with a suitable base plate 5, and is here shown as having two tracks 6, 7 in a carrier plate 7a, each of a general elliptical form contracted at about midlength of the sides thereof, as clearly indicated in Fig. 3. The said two tracks 6 and 7 are symmetrically arranged with respect to the longitudinal axis of the machine which is indicated at 8 in Fig. 3. The carriers 1 and 4 pertain to the tracks 6 and the carriers 2 and 3 pertain to the track 7, and the said carriers are caused to travel in said tracks or paths in the customary manner not necessary to explain in detail. The machine as shown in Fig. 1 is provided with a shaft 9 driven by a pulley 10 thereon so that the beveled gear 11 fast on the shaft rotates the beveled gear 12 on an upright shaft 13. Said shaft 13 at its lower end has fast thereon a gear 14 meshing with a suitable train of gears indicated at 15 and respectively arranged upon the several braiding carriers in customary manner so that the latter are driven and rotated in their respective paths in a manner usual in the art.

Each of said braiding carriers is preferably of the construction shown in Fig. 2a wherein a representative carrier such as 4 is shown as mounted in upright position for rotation. In parallelism with the said carrier 4 is a member 16 adapted to receive for up and down sliding movement thereon a tension weight or member 17 which receives the strand No. 4 from the carrier 4. The said member 17 is provided with a hole 18 through which the strand enters, passing over a suitable roll 19, then downwardly about another roll 20 and then upwardly through a guiding passage 21 in the upright 16 and thence to the braiding point. Each member 17 has connected thereto one end of a long coiled spring 22, the lower end thereof being connected at 23 to some part of the corresponding member 16 near the base thereof. Each spring 22 tends, therefore, to draw the corresponding tension member 17 downwardly against the upward pull of the strand as the latter passes to the braiding point.

The machine is shown in Fig. 1 as provided with two upright posts 24, 25, the latter being directly behind the vertical shaft 13 viewing Fig. 1. Near its upper end the shaft 13 is provided with a worm 26 meshing with which is a suitable worm gear on a short horizontal shaft 27 mounted in a bearing 28. On the shaft 27 is fast a gear 29 meshing with and driving a gear 30 on a transverse shaft 31 mounted in suitable bearings 32, 33 upon the posts 24, 25. A transversely extending member of the frame is indicated at 34 as supporting uprights 35, 36 which at their upper ends support a transverse shaft 37 receiving a suitable take-up spool 38. Upon the shaft 31, there is mounted a suitably grooved take-up roll 39, and if desired a second similar roll 40, and upon adjacent, suitably supported arm 41 is provided still another grooved take-up roll 42. The braided strand is passed in one or more turns about two or more of said grooved rolls so as to insure sufficient tension and then onto the take-up spool 38.

The parts thus far described may be and desirably are of usual construction. It is to be understood that the number of the braiding carriers may be greatly varied from the number shown and that the braided product may be round or flat in cross section as desired. For round work, if an increase in the number of the carriers is desired, the increase is in pairs, and for flat work the increase is by single carriers.

Although not limited to the use of flat strands, the mechanism of my invention is particularly adapted to the handling or control of flat strands so as to insure that the same face of each strand is always laid outermost, whether that strand be one the edges of which are folded over upon themselves so as substantially to meet and thus form what may be referred to as a seam at one face of the strand, or whether the strand is non-folded but has one superior and one inferior face as, for example, the hair side and the flesh side of a leather strand.

In order to insure the correct positioning of the several strands I provide means to rectify their position and preferably by providing means suitably to engage them in close proximity to the braiding point and the following mechanism represents the best form known to me of means for so controlling the said strands in proximity to the braiding point, to which mechanism, however, my invention is in no wise limited.

I shall therefore describe the same in detail, but it is to be understood that my invention may be embodied in various other mechanisms and devices for the same purpose.

Referring first to Fig. 3, there are provided four upright rods or posts 43, 44, 45 and 46, the number corresponding to the number of braiding carriers. As best indicated in Figs. 1 and 2, the said rods or posts are bent inwardly preferably at an abrupt angle so that their upper ends are thus brought together close to the actual braiding point of the machine. Each of the said rods or posts 43 to 46 is preferably provided with a rotatable portion with which the strand pertaining to that rod or post contacts.

While for this purpose many different structures may be provided, I preferably provide flattened portions 43a, 44a, 45a, 46a, for the reception of set screws 47. Slidable axially in each rod or posts 43 to 46 is a member of reduced diameter 48, 49, 50, 51, respectively held by said set screws 47 in adjusted position, and preferably rotatably received upon the said members 48, etc. are disks, rolls, balls or like members 52, 53, 54, 55 with which the respective strands actually engage as indicated most clearly in Figs. 4 to 9. In addition, each reduced portion 48, etc. is provided with a freely rotatable disk 56, 57, 58, 59, of larger diameter than the disks 52, 53, 54, 55, and serving to assist in guiding or positioning the respective strands. Viewing Figs. 4, 6 and 8, it will be noted that each disk or roll 52, 53, 54, 55, is very slightly offset to one side of the vertical axial line of the machine. Viewing said Figs. 4, 6 and 8 and looking upwardly from the bottom of the sheet, it will be noted that the disk or roll 52 for strand No. 1 is offset slightly to the right and that the disk 55 for strand No. 4 is offset slightly to the left. Similarly, the disk 53 for strand No. 2 is offset toward the disk 55 and the disk 54 for strand No. 3 is offset toward the disk 52.

The braiding point may be regarded as slightly below or within the tubular head 60 of Fig. 1, which head is suitably supported from the upper portion of the machine in such manner as to permit the forming braid to pass up therethrough to the take-up mechanism. In addition to the said disks or rolls 52 to 55, I preferably provide a wire or like member which is located in the exact longitudinal axis of the braiding mechanism, as indicated at 61. The said wire extends upwardly from a suitable support 62 and terminates preferably very slightly above the braiding point so that the braid that is being laid constantly is drawn off the upper end of the wire. The purpose of said wire is to provide a part that each strand spirals against so that the strand will not twist. While desirably the said wire terminates about a quarter of an inch above the actual braiding point, it may be of greater or less length as desired. The said wire or the support therefor is itself preferably provided with a horizontally arranged and preferably freely rotatable disk 62a, thus providing means which the strands touch from time to time, depending upon the positions of the respective carriers.

Having thus described the mechanism that may be employed in practising my invention, the action may be best understood by reference to Figs. 4 to 9 and 11 and 12. Figs. 4 and 5 are intended to represent the position of the four strands Nos. 1, 2, 3 and 4, at a given instant of time. At such instant strands Nos. 1 and 4 are acting as over-strands and are then moving in a clockwise direction as indicated by the arrows close thereto in Fig. 4 and the strands Nos. 2 and 3 are at the same instant of time acting as under-strands and are moving in a contraclockwise direction as indicated by the arrows adjacent thereto in Fig. 4. Strand No. 1 is in contact with the periphery of its small disk or roll 52 on the rising side thereof, and strand No. 4 is similarly in contact with its disk or roll 55 at the rising side thereof. The result is that the said two over-strands are at such instant lifted or moved outwardly or spread apart in the manner most clearly indicated in Fig. 11. This permits the other two strands, namely, the strands Nos. 2 and 3, which are then functioning as under-strands, to be crowded each up tight into the vertex of the angle that is at such instant formed by one over-strand and the axial wire 61, the rolls 52—55 holding the respective strands with the superior face outward.

Not only are the two over-strands (which at one instant of time would be the strands Nos. 1 and 4 and immediately thereafter would be strands Nos. 2 and 3) lifted by their respective small disks or rolls, but they are held up or out sufficiently long to allow the strands functioning as under-strands at that instant to position themselves properly before the over-strands drop down upon the under-strands and impair their proper positioning. Thus, the position of the strands is rectified.

Bearing in mind the fact that the main purpose of my invention is to cause each strand to be laid with the same face thereof always outermost, it is to be understood that the leading edge of an under-strand is the edge which would (if it were not for my invention) be displaced or turned if it were allowed to come in contact with an over-strand. Each under-strand may be regarded as always having a certain other strand related thereto as the over-strand from which the danger of displacement may come. In the machine herein shown, wherein there are four strands, it will be assumed that at a given instant of time strands Nos. 1 and 4 are the over-strands and strands Nos. 2 and 3 are the under-strands. Under-strand No. 2 would be in danger of being displaced by over-strand No. 1, and under-strand No. 3 would be in danger of being displaced by over-strand No. 4. By providing, however, means in close proximity to the braiding point and one type of which I have herein disclosed, and to which my invention is in no wise limited, the two strands which at any instant of time are acting as over-strands are prevented from causing displacement of the strands which are under-strands at that instant. By offsetting the said disks or rolls 52 to 55 as described, each strand is lifted late and is dropped late. If said disks or rolls are not offset each such disk or roll would push an under-strand as, for example, the under-strand No. 2 in position No. 1 (Fig. 4), which is coming up away from the axial wire 61 and toward the over-strand No. 4, which at that instant is going in the opposite direction. The amount of the offsetting may be varied, but I have obtained excellent results by offsetting each of said disks 52 to 55 about one sixteenth of an inch. An additional reason for the offsetting, and in fact the more important one, is that the drop of each over-strand onto the companion under-strand is delayed, as, for example, the drop of the over-strand No. 1 on the under-strand No. 2. If that drop were not delayed, as stated, the trailing edge of the over-strand No. 4 (referring to Fig. 4) would contact with the leading edge of the under-strand No. 2 and would tend to cause the leading edge of said under-strand No. 2 to be diverted from its proper direction, away from the axial wire 61 and toward a point further down the over-strand No. 4 than the vertex of the angle made by the said axial wire 61 and the trailing edge of said over-strand No. 4.

The opening up or spreading of the two over-strands, as, for example, the strands Nos. 1 and 4 of Fig. 11, is due not alone to the action of the said small disks or rolls but to the combined forces of the said disks or rolls lifting said two over-strands, together with the resulting heavier or greater tension effect exerted on said over-strands and caused by the greater tension of the corresponding springs 22 which are used to exert tension upon the strands. That is to say, the tension is greater on those coiled springs 22 which are at any given instant at the outermost points in their paths, as, for example, the coiled springs 22 for the carriers 1 and 4 as shown in Fig. 2. As the strands which are about to function as over-strands are carried away from the axial centre of the machine toward the outermost points, the springs 22 of those carriers are extended more and therefore give greater tension to their strands at such outermost points. This is true as to one instant of time for two strands, as, for example, strands Nos. 1 and 4 in Fig. 3, and almost immediately thereafter is true as to strands Nos. 2 and 3.

It will be observed that Fig. 12 represents the same strands as Fig. 11 but with the braiding movement carried a very little further, in that the under-strands Nos. 2 and 3 in Fig. 12 are being crowded closely into their position near the top of the axial wire 61.

Instead of using the wire 61 or even in conjunction therewith, I may and preferably do provide means for applying to the strands some material to cause the strands to adhere tightly throughout their length in their correct braiding position. For this purpose, I preferably provide some lacquer solvent. In order to convey the same to the braiding point, I have, as best shown in Figs. 1 and 1a, provided a receptacle 63 to receive the lacquer or other liquid material. I provide a thread of cotton or other material 64 adapted to be drawn from a spool 65 and to pass about suitable guides 66 and 67 into the axial path of the machine. For that purpose, I provide a post 68 supported in the base of the machine in the axial centre thereof and support in that post a tube 69 which may, if desired, have an idle disk 70 at the upper end thereof. Supported within the tube 69 is an inner tube 71 and within that is a small, long tube 72 of almost needle-like character and which extends upwardly to or close to the braiding point. The cotton or other thread 64 receives the lacquer-like material from the receptacle 63 and passing upward through the inner tube 73 conveys the said liquid to the surfaces of the said strands so as to cause said strands to adhere. Said thread 64, of course, becomes incorporated in the braid at the axis thereof. The resulting braid is shown in Fig. 1a at 74.

It will be understood that the members 52—55 may be positively (that is, mechanically) rotated, especially when using some strand material that requires light tension and which is apt to stretch longitudinally when being braided, such as real leather. When so mechanically rotated, I prefer to rotate said members 52—55 from the drive gear 15 for the carriers by any suitable mechanical driving connections, thus securing synchronism in the positive rotation of the members 52—55 and the rotation of the said carriers themselves.

Having thus described one illustrative embodiment of my invention involving the mechanism of and process for making braiding strands and the resulting product, it is to be understood that although specific terms are employed, they are used in a generic and descriptive sense and not for purposes of limitation, the scope of the invention being set forth in the following claims.

I claim:

1. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in braiding relation along predetermined paths so as to braid together said several strands, and at points in close proximity to the braiding point engaging periodically and for brief intervals one or more of said strands with substantial pressure or force so as to control the position thereof and thus to prevent the leading edge of one of the strands from being displaced from its true position by another strand of the series.

2. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in differentiated paths so as to lay said strands respectively over or under other strands, and at points in close proximity to the braiding point briefly and periodically engaging one or more of the strands in turn with substantial pressure or force so as to control the position thereof and thus to prevent the leading edge of a strand when it is an under-strand from being displaced from its true position by a strand acting at that time as an over-strand.

3. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in differentiated paths so as to lay said strands respectively over or under other strands, and at points in close proximity to the braiding point briefly and periodically engaging one or more of the strands in turn with substantial pressure or force so as to control the position thereof and thus to prevent the leading edge of a strand when functioning as an under-strand from being displaced from its true position by the trailing edge of a strand acting at the same instant as an over-strand.

4. That method of making a braid from a series of substantially flat strands in such manner as to position in the braid each strand with the same face thereof always outermost, including the following steps: feeding or delivering a series of substantially flat strands to the path of the forming baid, each from its own braiding carrier, moving said braiding carriers in differentiated paths so as to lay said strands respectively over or under other strands, and at points in close proximity to the braiding point briefly and periodically engaging one or more of the strands in turn with substantial pressure or force so as to control the position thereof and thus to allow each strand when functioning as an under-strand to position itself properly at the braiding point before the strand or strands then functioning as over-strands are laid thereonto.

5. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in braiding relation along differentiated paths so as to braid together the several strands, spreading certain of the strands to prevent them from displacing edges of any of the other strands, and then in turn spreading the last mentioned strands to prevent them in turn from displacing the first mentioned strands, and continuing such operations in sequence substantially throughout the braiding operation.

6. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in sets in differentiated paths so as to lay the strands respectively over and then under the other strands, and at points relatively close to the braiding point lifting the over-strands to allow the under-strands to be laid tightly at the braiding point without displacement.

7. Braiding mechanism including in combination, a series of braiding carriers, means to feed or deliver substantially flat strands therefrom to the braiding point, means to move said carriers in contrasting paths so as to lay the said strands respectively over and under each other, and means in proximity to the braiding point to engage one or more of the strands so as to control the laying of such strand or strands with the desired face outermost and to prevent another strand from displacing the same.

8. Braiding mechanism including in combination, a series of braiding carriers, means to feed or deliver substantially flat strands therefrom to the braiding point, means to move said carriers in contracting paths so as to lay the said strands respectively over and under each other, guiding means in close proximity to the braiding point to control and secure the laying of each strand with the predetermined face thereof always outermost.

9. Braiding mechanism including in combination, a series of braiding carriers, means to feed or deliver substantially flat strands therefrom to the braiding point, means to move said carriers in contrasting paths so as to lay the said strands respectively over and under each other, means in close proximity to the braiding point to spread one set of strands so as to prevent the displacement by said strands of any of the strands of another set.

10. Braiding mechanism including in combination, a series of braiding carriers, means to feed or deliver substantially flat strands therefrom to the braiding point, means to move said carriers in contrasting paths so as to lay the said strands respectively over and under each other, and means in close proximity to the braiding point to lift the over-strands so as to allow the under-strands to be laid tightly at the braiding point.

11. Braiding mechanism including in combination, a series of braiding carriers, means to feed or deliver substantially flat strands therefrom to the braiding point, means to move said carriers in contrasting paths so as to lay the said strands respectively over and under each other, and means in close proximity to the braiding point to lift and hold the over-strands sufficiently long to allow the under-strands properly to position themselves before said over-strands drop down upon said under-strands.

12. Braiding mechanism including in combination, a series of braiding carriers, means to feed or deliver substantially flat strands therefrom to the braiding point, means to move said carriers in contrasting paths so as to lay the said strands respectively over and under each other, and means comprising a rotatable member for each strand, close to the braiding point, to engage said strands for the purpose set forth.

13. Braiding mechanism including in combination, a series of braiding carriers, means to feed or deliver substantially flat strands therefrom to the braiding point, means to move said carriers in contrasting paths so as to lay the said strands respectively over and under each other, and a guide for each strand close to the braiding point, of disk-like form, to position the over-strands and to move the over-strands sufficiently to permit the under-strands to be laid without interference by said over-strands.

14. Braiding mechanism including in combination, a series of braiding carriers, means to feed or deliver substantially flat strands therefrom to the braiding point, means to move said carriers in contrasting paths so as to lay the said strands respectively over and under each other, an axial guide extending from below the braiding point to a position somewhat above the braiding point, and means in proximity to the braiding point to spread or move the over-strands so as to allow the under-strands each to crowd up tight into the vertex of the angle made by one of said over-strands and the said axial guide.

15. Braiding mechanism including in combination, a series of braiding carriers, means to feed or deliver substantially flat strands therefrom to the braiding point, means to move said carriers in contrasting paths so as to lay the said strands respectively over and under each other, and means in proximity to the braiding point to engage one or more of the strands so as to control the laying of such strand or strands with the desired face outermost and to prevent another strand from displacing the same, and means to apply to the forming braid a material to cause the strands thereof to adhere together after final positioning.

16. Braiding mechanism including in combination, a series of braiding carriers, means to feed or deliver substantially flat strands therefrom to the braiding point, means to move said carriers in contrasting paths so as to lay the said strands respectively over and under each other, an axial guide at the braiding point, and means in proximity to the braiding point to compel the crowding of each under-strand tight up into the vertex of the angle made by one of the over-strands and said axial guide.

17. Braiding mechanism including in combination, a series of braiding carriers, means to feed or deliver substantially flat strands therefrom to the braiding point, means to move said carriers in contrasting paths so as to lay the said strands respectively over and under each other, and means in proximity to the braiding point, one for each strand and each slightly offset with respect to its own strand, to cause a delayed picking up of an over-strand and a delayed letting go thereof in such manner as to prevent such strand from interfering with the true positioning of an under-strand.

18. Braiding mechanism including in combination, a series of braiding carriers, means to feed or deliver substantially flat strands therefrom to the braiding point, means to move said carriers in contrasting paths so as to lay the said strands respectively over and under each other, and freely rotatable means for each strand close to the braiding point and each slightly offset with respect to the path of delivery of its own strand so as to lift and then drop such strand, for the purpose set forth.

19. That method of making a braid from a series of substantially flat strands in such manner as to position in the braid each strand with the same face thereof always outermost, including the following steps: feeding or delivering a series of substantially flat strands to the path of the forming braid, each from its own braiding carrier, moving said braiding carriers in braiding relation along predetermined paths so as to braid together said several strands, and at points in close proximity to the braiding point and during said feeding or delivering step, predeterminedly rectifying or correcting the position of said strands so as thereby to prevent the leading edge of one of the strands from being displaced from its true position by another strand of the series.

20. Braiding mechanism including in combination, a series of braiding carriers, means to feed or deliver substantially flat strands therefrom to the braiding point, means to move said carriers in contrasting paths so as to lay the said strands respectively over and under each other, predeterminedly acting means in close proximity to the braiding point to rectify or correct the position of the strands, thereby to effect the laying of each strand with the predetermined face thereof always outermost.

ROGER W. HALE.